United States Patent
Gilad et al.

(10) Patent No.: US 11,509,943 B1
(45) Date of Patent: Nov. 22, 2022

(54) SYSTEM AND METHOD FOR REMUNERATING A DISPLAY OF A COGNATE SUBSTITUTE VIDEO

(71) Applicants: Oran Gilad, Herzliya Pituach (IL); Samuel Chenillo, New York, NY (US); Oren Steinfeld, Kfar Saba (IL)

(72) Inventors: Oran Gilad, Herzliya Pituach (IL); Samuel Chenillo, New York, NY (US); Oren Steinfeld, Kfar Saba (IL)

( * ) Notice: Subject to any disclaimer, the term of this patent is extended or adjusted under 35 U.S.C. 154(b) by 0 days.

(21) Appl. No.: 17/330,419

(22) Filed: May 26, 2021

(51) Int. Cl.
| | |
|---|---|
| H04N 21/234 | (2011.01) |
| H04N 21/2343 | (2011.01) |
| H04N 21/2543 | (2011.01) |
| H04N 21/24 | (2011.01) |
| H04N 21/258 | (2011.01) |

(52) U.S. Cl.
CPC . H04N 21/23418 (2013.01); H04N 21/23424 (2013.01); H04N 21/23439 (2013.01); H04N 21/2407 (2013.01); H04N 21/2543 (2013.01); H04N 21/25841 (2013.01)

(58) Field of Classification Search
CPC ....... H04N 21/23418; H04N 21/23424; H04N 21/23439; H04N 21/2407; H04N 21/2543; H04N 21/25841
See application file for complete search history.

(56) References Cited

U.S. PATENT DOCUMENTS

| | | | |
|---|---|---|---|
| 2003/0220866 A1* | 11/2003 | Pisaris-Henderson | G06Q 30/02 705/37 |
| 2004/0194130 A1* | 9/2004 | Konig | H04N 5/76 725/32 |
| 2010/0318419 A1* | 12/2010 | Vieri | G06Q 30/0246 705/14.45 |
| 2014/0040040 A1* | 2/2014 | Townsend | G06Q 30/0279 705/14.66 |
| 2014/0095306 A1* | 4/2014 | Avalos | G06Q 30/0261 705/14.53 |
| 2017/0188115 A1* | 6/2017 | Bafekr | H04N 21/2668 |
| 2021/0034879 A1 | 2/2021 | Chenillo | |

* cited by examiner

*Primary Examiner* — Benjamin R Bruckart
*Assistant Examiner* — Tien M Nguyen
(74) *Attorney, Agent, or Firm* — RosserIP, LLC; Roy Rosser

(57) ABSTRACT

A system and method for remunerating a display of a cognate substitute image sequence is disclosed. Images sequences in received video content are examined for sequences that are cognate to known image sequences. When detected, such sequences are replaced with cognate substitute image sequences to create a modified video image stream that is displayed on a display screen. A reasonable remuneration for displaying the cognate substitute image is automatically calculated. This monetary charge reflects the nature of the image sequence, the time it was displayed for, the time at which was displayed and the number of electronic devices within viewing range of the display at the time of display. This remuneration is accumulated, and equivalent digital assets automatically transferred between client and provider accounts at an appropriate time.

14 Claims, 2 Drawing Sheets

SYSTEM AND METHOD FOR REMUNERATING A DISPLAY OF A COGNATE SUBSTITUTE VIDEO

CROSS-REFERENCE TO RELATED APPLICATIONS

This is a US continuation-in-part application of U.S. Ser. No. 17/072,491 entitled "System and Method for Identifying Cognate Image Sequences" filed on Oct. 16, 2020 that is in turn a continuation-in-part of U.S. patent application Ser. No. 16/389,957 entitled "System and Method for Media Segment Identification" filed on Apr. 21, 2019, that is a continuation-in-part US Patent application of now issued U.S. Pat. No. 10,271,095 entitled "System and Method for Media Segment Identification" that issued on Apr. 23, 2019, having been filed as U.S. patent application Ser. No. 16/110,265 on Aug. 23, 2018, that in turn claims priority to U.S. patent application Ser. No. 15/852,389 filed on Dec. 22, 2017 entitled "System for the Augmented Assessment of Virtual Insertion Opportunities", now U.S. Pat. No. 10,096,169 issued on Oct. 9, 2018, and to U.S. Provisional Patent Application 62/608,666 filed on Dec. 21, 2017 entitled "Augmented Virtual Video-Insertion", the contents of all of which are hereby fully incorporated herein by reference.

BACKGROUND OF THE INVENTION

(1) Field of the Invention

The invention relates to a system and method for obtaining remuneration for displaying digital content such as, but not limited to, an image substituted for an image sequence automatically recognized as cognate to a known image sequence, and more particularly, to calculating said remuneration, in part, proportional to an automatically obtained count of electronic viewing devices withing viewing range of the displayed images.

(2) Description of Related Art

The technical problems of calculating a reasonable remuneration for the display of content, or the failure to display content, and of obtaining that remuneration are inherent in the field of commercial video or television broadcasting and/or streaming.

It is generally accepted that reasonable remuneration takes into account factors such as, but not limited to, the quality, or desirability, of the content, the time at which the content is shown, the amount of content shown, and the size of the audience viewing the content.

Traditional methods of estimating audience size focus on the number of devices on which the content is being delivered. There are, however, situations in which merely knowing how many display devices are being used may be significantly misleading. Examples of such situations include, but are not limited by, the display of media at a sporting or concert stadium, the display of media within a bar or other entertainment location, and the display of media within a hotel lobby or airport lounge. In such situations it may be desirable to obtain a reasonable estimate of the number of people who are within viewing range of the device on which the media is being displayed, and have the remuneration reflect that number.

A further complication is of knowing what content was shown on the display device and when, or for how long, it was show. This is exasperated by the ability of venue owners to selectively substitute out and replace their own content on the display. This may be done for a number of reasons such as, but not limited to, not wanting to display content in a restaurant or bar that relates to rival products, or to content such as advertisements for alcohol that may be deemed inappropriate in a school auditorium or church hall.

Yet a further complication is the actual calculation of appropriate remuneration and the payment or receipt of the agreed remuneration.

It is therefore highly desirable to provide a system and method for remunerating a display of substituted content such as, but not limited to, cognate substitute images, that may base the remuneration of a reasonable estimate of the actual number of people viewing the content. It is also desirable that such a system may facilitate the actual payment of the remuneration by automatically facilitating transfers of assets.

The relevant prior art includes:

US publication 2021-0034879 entitled "System and Method for Identifying Cognate Image Sequences" that was published on Feb. 4, 2021 that describes a system and method of identifying cognate image sequences. The system examines significant frames of a stream of video images using an array of image indexes. The image index array includes image indexes obtained by at least two different image indexing methods. These are compared to a corresponding array of image indices of significant frames of known image sequences. An image quality indicator is used to determine which set of image index thresholds to use in making the comparison. These thresholds are more stringent for higher quality frames. Two image sequences are considered cognate when a string of sufficiently many sequential frame matches is established. In an alternate embodiment, image blurriness is also, or instead, used to determine the appropriate set of image index thresholds. The sets of image index thresholds are determined using machine learning on a curated set of representative images.

Various implementations are known in the art but fail to address all of the problems solved by the invention described herein. Various embodiments of this invention are illustrated in the accompanying drawings and will be described in more detail herein below.

BRIEF SUMMARY OF THE INVENTION

An inventive system and method for remunerating a display of a cognate substitute image is disclosed.

In a preferred embodiment, a stream of video images may be received by a digital processor en-route to a display device. The digital processor may use a cognate identifier module to automatically identify any sequences in the incoming stream that are cognate with any of a number of known video images sequences stored in a database accessible to the digital processor. If a cognate sequence is found, i.e., a sequence sufficiently similar to the known sequence that it may be reasonably assumed they both derive from a common source, the digital processor may use a substitution module to replace the identified cognate image sequence with a cognate substitute image that may be taken from another database accessible to the digital processor. In making the substitution, the digital processor may automatically create an alternative video image stream that may then be displayed on the display screen. The digital processor may also have a remuneration module that may calculate a reasonable remuneration for displaying the cognate substitute image. The reasonable remuneration may consider factors such as, but not limited to, the nature of the image displayed, the amount of time it was displayed for and the time of day or night it was displayed or some combination thereof. The remuneration module may then record an accumulated monetary charge related to the image display.

In a further embodiment, the system may also incorporate an electronic device detector calibrated to provide a count of electronic devices within a viewing range of said display device. What may be detected may be cellphones. A count of the cellphones within a viewing range may serve as a reasonable proxy for the number of people within viewing range. This count may, therefore, be used by the remuneration module in calculating said accumulated monetary charge. The charge may, for instance, be, in part, proportional to the count of electronic devices within the viewing range.

In yet a further embodiment, the remuneration module may be programmed to automatically transfer digital assets equal in value to the accumulated monetary charge from a client account to a provider account, or vice versa.

Therefore, the present invention succeeds in conferring the following, and others not mentioned, desirable and useful benefits and objectives.

It is an object of the present invention to provide a convenient system for both identifying and substituting out cognate image sequences, and for evaluating a reasonable remuneration based, in part of a count of electronic devices serving as a proxy for actual viewers of content.

DETAILED DESCRIPTION OF THE INVENTION

Figure 1:
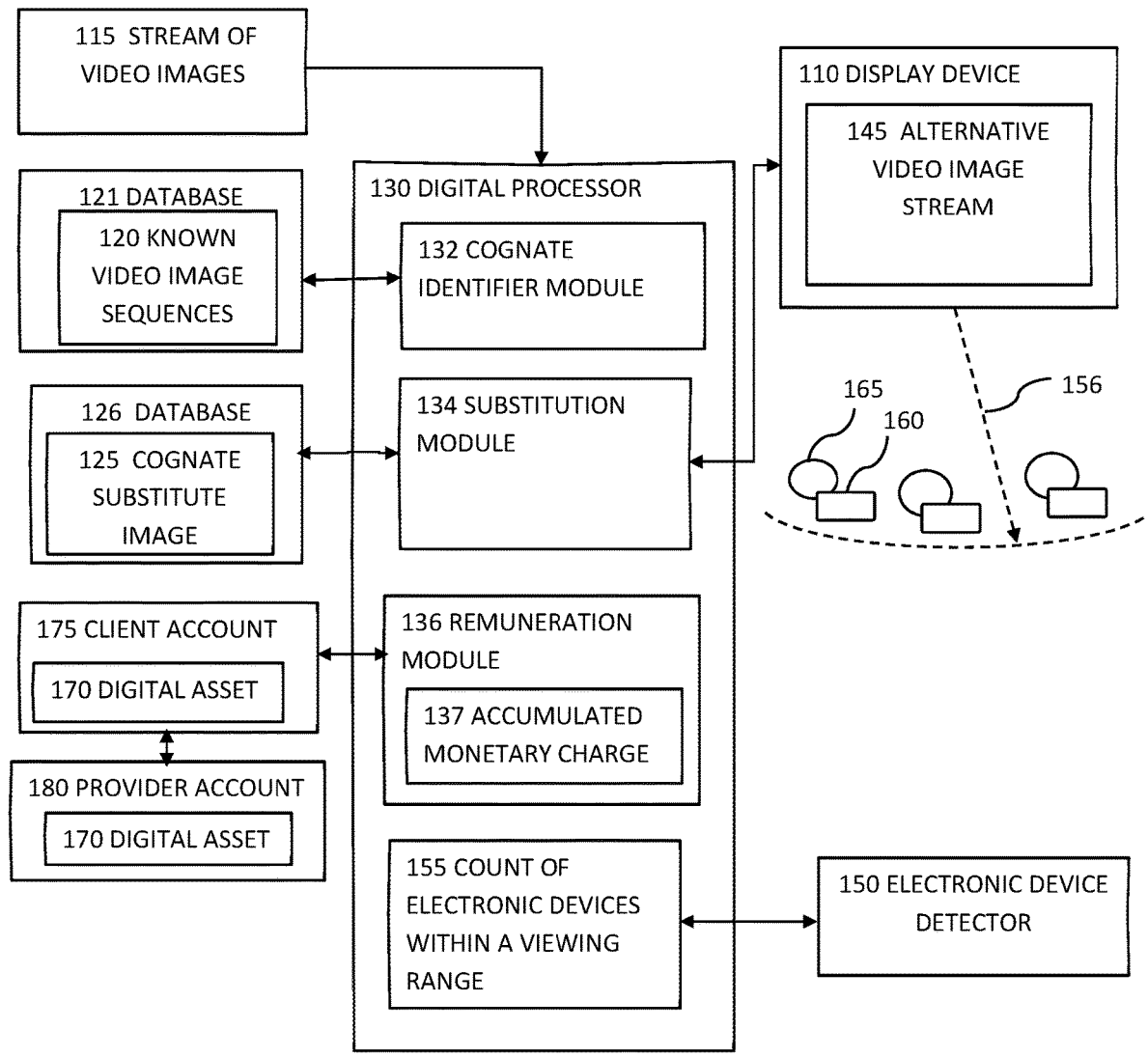
FIG. 1 shows a schematic view of a system for remunerating a display of a cognate substitute image of the present invention.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic view of a system for remunerating a display of a cognate substitute image of the present invention.

As shown schematically in FIG. 1, one or more viewers 165 may be watching multimedia content being displayed on a display device 110. A component of that multimedia content may originate as a stream of video images 115 that may, for instance, be being broadcast or live streamed to a venue where the viewers may be located. Before being displayed, the stream of video images 115 may be examined by a digital processor 130. The digital processor may, for instance, include a cognate identifier module 132 that may be functionally connected to a database 121 of known video image sequences 120. The cognate identifier module may be programmed to automatically identify video sequences in the stream of video images that may be cognate with a video sequence in the database comprising known video image sequences. Cognate sequences may be defined as two image sequences that may not be identical, one or both of them having been altered slightly by, for instance, compression and decompression algorithms, content provider overlays, by the channel picture-in-picture layout, or some combination thereof. but nevertheless, may be identified as both being from the same original sequence. Methods of automatically identifying cognate image sequences are described in detail in, for instance, US publication 2021-0034879 entitled "System and Method for Identifying Cognate Image Sequences" that was published on Feb. 4, 2021, and which is incorporated herein by reference in its entirety.

Having identified a cognate image sequence, the digital processor 130 may invoke a substitution module 134 that may be programmed to alter the stream of video images 115 by substituting an image, or image sequence, for the cognate image sequence, thereby creating a modified video image stream 145. The cognate substitute image 125 may, for instance, be selected from a database 126 comprising at least one cognate substitute image that may be functionally connected to the substitution module. The cognate substitute image 125 may also or instead be an image sequence.

The video images may be formatted in any of the well-known digital image file formats such as, but not limited to, HTML5 video, GIF, MPEG-1, MPEG-4, MP3, AVI, Quick-Time, or some combination thereof.

The digital processor 130 may also contain a remuneration module 136 that may be a software module programmed to calculate a remuneration for the display of the cognate substitute image 125. The remuneration may also, or instead, calculate a compensation for the non-display of the video image sequence that may have been substituted out. The compensation may, for instance, account for factors such as, but not limited to, the temporal length of the cognate substitute image 125, its nature, the time at which the substitution was made, and the number of viewers of the substituted image in the modified video image stream. The compensation may for instance be calculated by a formula such as, but not limited to:

$$C = R \times t \times T \times N \qquad (1)$$

Where C is the dollar amount of the compensation, R is a base rate in dollars, t is the length of time for which the cognate substitute image or video sequence was shown, T is a time of viewing multiplier and N is the estimated number of viewers.

The calculated compensation may be stored by the remuneration module 136 as an accumulated monetary charge 137 that may represent monetary amounts owned to one or more clients or providers.

In a preferred embodiment, the estimate of the number of viewers may be obtained by obtaining a count of electronic devices within a viewing range 155. Such a count may be automatically obtained by a count of electronic devices within a viewing range 155 module operative on the digital processor. Such a count of electronic devices may be functionally connected to an electronic device detector 150.

Such electronic device detectors are well-known. An example is, for instance, the PRO-10G Cellphone detector sold by BrickHouse of Indianapolis, Ind. 46278. Such cellphone detectors typically function by monitoring the cellphone-to-tower radio frequency (RF) signals emitted by the cellphone. Even when in standby mode, such signals are emitted intermittently. The location of the cellphone may be estimated by, for instance, the relative strength of the RF signals, and individual cellphones may be identified by some or all of the content of the RF signal packets. Cellphones are so ubiquitous, and so associated with individuals, that a count of a number of cellphones at a venue may be taken as a good estimate of the number of individual people at the venue.

Other electronic device detectors may also or instead be used such as, but not limited to, WiFi or BlueTooth chip scans. WiFi and BlueTooth equipped cellphones typically have chips that scan periodically to ascertain the location of nearby base stations. These scans typically occur periodically at rate of about once every half second and contain the device MAC address. Monitoring such cellphone scans and their relative strength may, therefore, identify the number of unique cellphones located within a viewing range.

The electronic device detector 150 may be used to obtain a count of electronic devices within a viewing range 155. The number of cellphones 160 within the viewing range 156 may be taken as a good proxy for the number of viewers 165 located within viewing range of the display device displaying the modified video image stream at most venues such as, but not limited to, sports stadiums, concert stadiums, hotel lobbies, bars, airport lounges, and train and bus waiting rooms.

The viewing range may, for instance, be a distance that is less than or equal to a maximum distance from which the display of video images on the display device is intelligible to an average sighted human.

In a further embodiment of the invention, the remuneration module 136 may be programmed to automatically transfer payments between clients and providers and vice-versa. The module may, for instance, be programmed to automatically transfer a digital asset 170 having a monetary value equal to the accumulated monetary charge from a client account 175 to a provider account 180. Such transfers may, for instance, take place at predetermined times such as, but not limited to, at the close of business each day or night, or at the end of a week or at the end of a month, or the end of a year, or some combination thereof.

Figure 2:
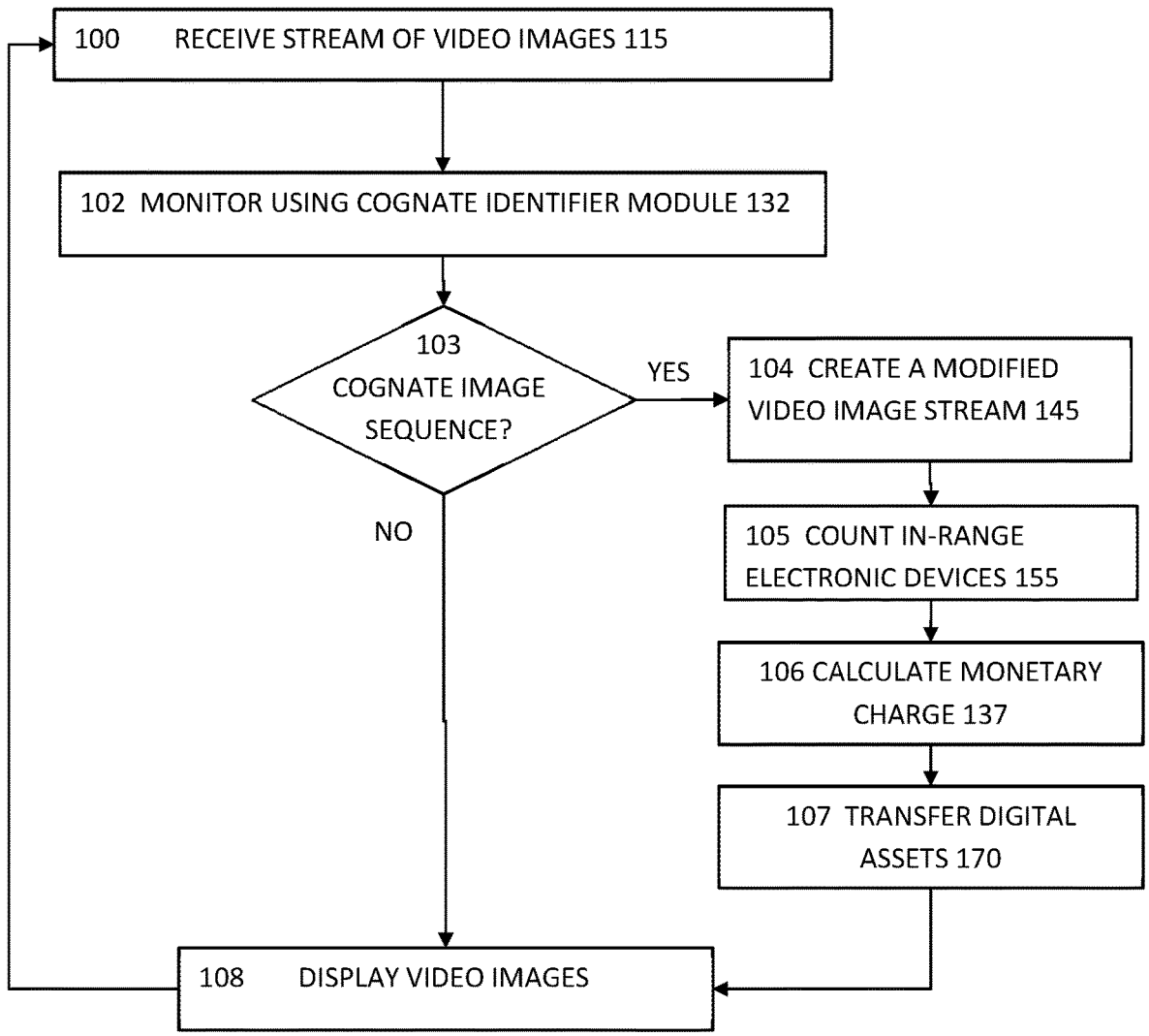
FIG. 2 shows a flow chart showing representative steps of implanting one embodiment of a method for remunerating a display of a cognate substitute image of the present invention.

FIG. 2 shows a flow chart showing representative steps of implanting one embodiment of a method for remunerating a display of a cognate substitute image of the present invention.

In Step 100 "RECEIVE STREAM OF VIDEO IMAGES 115", multimedia digital content may be received at a venue such as, but not limited to, a sport, an event stadium, a restaurant, a bar, an airport lounge or some similar facility at which people may gather. The venue manages may want to display the digital content on a suitable device such as, but not limited to, a large screen video display for viewing by the people gathered there. However, they may also be desirous of avoiding displaying certain types of content that may be included in the received stream of video images. For instance, a venue may not want to display content such as, but not limited to, content that is violent, is emotionally disturbing, sexually explicit, is deemed to be inaccurate, promotes undesirable or rival products, or some combination thereof. The venue proprietors may desire to replace such content with alternative content. They may also be desirous of providing appropriate compensation for content that was not displayed, and appropriate charges for the display of substituted content. To achieve this objective, the venue proprietors may proceed to Step 102.

In Step 102 "MONITOR USING COGNATE IDENTIFIER MODULE 132", a cognate identifier module 132 operative on a digital processor. A cognate identifier module may be a software module programmed to compare the incoming stream of video images with those stored in a database having known video image sequences, i.e., video image sequences known to be ones that the venue proprietors desire to substitute out. Such a module may, for instance, be constructed as described in detail in US publication 2021-0034879 entitled "System and Method for Identifying Cognate Image Sequences" that was published on Feb. 4, 2021, the contents of which are fully incorporated herein by reference.

In Step 103 "COGNATE IMAGE SEQUENCE?" the cognate identifier module may decide on whether or not a cognate image sequence has been identified in the incoming stream of video. If such a sequence is detected, the method may proceed to Step 104.

In Step 104 "CREATE A MODIFIED VIDEO IMAGE STREAM 145", the digital processor may activate a substitution module. The substitution module may be programmed to automatically select a suitable cognate substitute image from a database containing at least one such cognate substitute image. The cognate substitute image may be a video sequence and the video sequence may be selected to be, or adjusted to be, equal in temporal length to the cognate image sequence being substituted to create the modified video image stream. The cognate substitute image may be selected at random or may be based on a predetermined playlist.

If no cognate image sequence was identified in Step 103, the system may automatically proceed to Step 108 and display the received stream of video images on the display device.

If, however, the system has moved on to Step 104 and created a modified video image stream, the system may then proceed to Step 105.

In Step 105 "COUNT IN-RANGE ELECTRONIC DEVICES 155", the system may obtain a count of electronic devices located within a viewing range, within a distance from the display device that is less than or equal to a maximum distance from which the display of the modified video image stream on the display device is intelligible to an average sighted human.

Such a count may be obtained automatically using a suitably programmed module operable on the digital processor that may be in function communication with a electronic device detector. As mentioned above, electronic device detectors capable of such functionality are well-known. One such suitable device may, for instance, be the PRO-10G Cellphone detector sold by BrickHouse of Indianapolis, Ind. 46278. Such cellphone detectors typically function by monitoring the cellphone-to-tower radio frequency (RF) signals emitted by the cellphone. The presence of a cellphone within viewing range may be taken as a good indicator, or proxy, of the presence of a person capable of viewing the display device.

Other electronic device detectors may also or instead be used such as, but not limited to, WiFi or BlueTooth chip scans. WiFi and BlueTooth equipped cellphones typically have chips that scan periodically to ascertain the location of nearby base stations. These scans typically occur periodically at rate of about once every half second and contain the device MAC address. Monitoring such cellphone scans and their relative strength may, therefore, identify the number of unique cellphones located within a viewing range.

The system may then proceed to Step 106 "CALCULATE MONETARY CHARGE 137". In this step, the system may use the remuneration module 136 to automatically a reasonable remuneration, or monetary charge, as a value for showing, or compensation for not showing, video sequences on said display device. Such reasonable remuneration may, for instance, account for factors such as, but not limited to, the temporal duration of the video sequences shown or not shown, the nature of the video sequences, the time of day when the sequences were shown and the number of digital devices with viewing range at the time of showing, or some combination thereof. A suitable formula for such a calculation may, for instance, take the form:

$$C = R \times t \times T \times N \qquad (2)$$

Where C may be the charge expressed in some known monetary unit such as, but not limited to, dollar, pounds, Euros, pesos, bitcoins, dogecoins or some combination thereof; t may be the length of time for which the video sequence was shown, T may be some number indicative of the time of day and the value of displaying at that time and N may be the count of electronic devices within viewing range at the time of showing.

Such calculated charges may be stored as an accumulated monetary charge by the remuneration module.

The system may then move to Step 107 "TRANSFER DIGITAL ASSETS 170". In this step, the remuneration module may automatically make monetary transfers between accounts. The system may, for instance, automatically transfer digital assets between the accounts of clients and providers. Such electronic transfers may make use of conventional bank transfer mechanisms or of more recent methods such as, but not limited to, PayPal or Venmo. The transfers may reflect the accumulated monetary charges attributed to various accounts and may occur immediately the video sequence is displayed or may be made later at some suitable time such as, but not limited to, the close of business, the end of a week, the end of a month, the end of a year, or some combination thereof.

In a further embodiment of the invention, there may be a vending station attached to or associated with the display system. The vending station 185 may, for instance, display and sell goods or services such as, but not limited to, food, drinks, merchandise, or some combination thereof. The vending machine may also be functionally associated with a point-of-purchase payment device 190 that may in turn be functionally associated with the remuneration module and the substitution module. The remuneration module may, by interacting with the point-of-purchase payment device 190 and the substitution module 134 be able to ascertain the effect of a particular cognate substitute image or video on the sales of one or more items. The cognate substitute image may, for instance, be provided by a third party and be a part of a marketing, public service, or political campaign. The remuneration module may, therefore, be able to provide that third party with an immediate and detailed report on the degree of success of their campaign.

In a further embodiment, the cognate substitute video may be part of a third party streaming or broadcast of multimedia content. In order to ensure the correct sequences are available for substitution at a desired time, the content may be pre-supplied in an encrypted form. In that scenario, the decryption code may be provided at the appropriate time, thereby ensuring that the video may not be pre-disclosed but at the same time ensuring it may be available for switching to at the desired, appropriate time.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A system for remunerating a display of a substituted image, comprising:
   a display device located at a venue;
   a stream of incoming video images;
   a first database comprising known video image sequences said known image sequences being image sequences previously identified as image sequences unsuitable for display at said venue;
   a second database comprising at least one substitute image, said substitute image being an image suitable for display at said venue;
   a digital processor located at said venue comprising:
      a cognate identifier module;
      a substitution module; and,
      a remuneration module;
   monitoring, by said cognate identifier module, said stream of incoming video images to automatically identify an occurrence of an image sequence that is not identical to any of said known image sequences, but is deemed by said cognate identifier module to be sufficiently similar to one of said known image sequences to determine that they both originated from a common source and is, therefore, cognate to one of said known image sequences, using a method of identifying cognate images comprising:
   comparing a first significant frame of said incoming stream of video images to one or more first significant frames of said known image sequences, said comparing comprising:
      obtaining an array of image indexes of said significant frames;
      determining an image quality indicator of one or more of said significant frames;
      selecting, based on said image quality indicator, a set of predetermined image index thresholds from an array of predetermined image index thresholds;
      determining a first significant frame match to have occurred if a difference in the image indices of all the image indices is less than or equal to said selected, predetermined image index threshold corresponding to said image indexing method;
   for said known video image sequence in which a match has occurred, repeating the preceding steps of comparing using a next significant frame; and,
      when said matching occurs sequentially for a predetermined number of significant frames in a particular known video image sequence, identifying said incoming stream of video images as being cognate with said particular known video image sequence;
   creating, by said substitution module when said occurrence of said image sequence is identified as being cognate to said known image sequence, an alternate video image stream having one of said substitute images in place of said image sequence deemed to be cognate to said known image sequence identified as unsuitable for display at said venue;
   displaying, by said display device, said alternate video image stream; and
   recording, by said remuneration module, an accumulated monetary charge, said accumulated monetary charge comprising a reasonable remuneration for displaying said substitute image in said alternate video image stream.

2. The system of claim 1, further comprising:
   an electronic device detector calibrated to provide a count of electronic devices within a viewing range of said display device;

using said electronic device detector to obtain said count of electronic devices within a viewing range, and, calculating said accumulated monetary charge, in part, proportional to said count of electronic devices within said viewing range.

3. The system of claim 2, wherein, said count of electronic devices within viewing range is obtained, in part, using cellphone-to-tower RF signal monitoring of a cellphone of a viewer.

4. The system of claim 3, wherein said viewing range is a distance that is less than or equal to a maximum distance from which said display of said modified video image stream on said display device is intelligible to an average sighted human.

5. The system of claim 1 further comprising:

automatically transferring, using said digital processor, a digital asset having a monetary value equal to said accumulated monetary charge from a client account to a provider account.

6. The system of claim 1, wherein, said substitute image is a video image sequence equal in temporal duration to said cognate image sequence.

7. The system of claim 1, wherein said accumulated monetary charge is automatically calculated, in part, proportional to a temporal duration of said cognate image sequence.

8. A method for remunerating a display of a substituted image, comprising:

providing a display device at a venue;

receiving a stream of incoming video images;

providing a first database comprising known video image sequences, said known image sequences being image sequences previously identified as image sequences unsuitable for display at said venue;

providing a second database comprising at least one substitute image, said substitute image being an image suitable for display at said venue;

providing a digital processor located at said venue, comprising:
  a cognate identifier module;
  a substitution module; and,
  a remuneration module;

monitoring, by said cognate identifier module, said stream of incoming video images to automatically identify an occurrence of an image sequence that is not identical to any of said known image sequences, but is deemed by said cognate identifier module to be sufficiently similar to one of said known image sequences to determine that they both originated from a common source and is, therefore, cognate to one of said known image sequences, using a method of identifying cognate images comprising:

comparing a first significant frame of said incoming stream of video images to one or more first significant frames of said known image sequences, said comparing comprising:

obtaining an array of image indexes of said significant frames;

determining an image quality indicator of one or more of said significant frames;

selecting, based on said image quality indicator, a set of predetermined image index thresholds from an array of predetermined image index thresholds;

determining a first significant frame match to have occurred if a difference in the image indices of all the image indices is less than or equal to said selected, predetermined image index threshold corresponding to said image indexing method:

for said known video image sequence in which a match has occurred, repeating the preceding steps of comparing using a next significant frame; and, when said matching occurs sequentially for a predetermined number of significant frames in a particular known video image sequence, identifying said incoming stream of video images as being cognate with said particular known video image sequence;

creating, by said substitution module when said image sequence is identified as being cognate to said known image sequence, an alternative video image stream having one of said substitute images in place of said image sequence deemed to be cognate to said known image sequence identified as unsuitable for display at said venue;

displaying, by said display device, said alternate video image stream; and recording, by said remuneration module, an accumulated monetary charge, said accumulated monetary charge comprising a reasonable remuneration for displaying said substitute image in said alternate video image stream.

9. The method of claim 8, further comprising:

providing an electronic device detector calibrated to provide a count of electronic devices within a viewing range of said display device;

automatically obtaining said count of electronic devices within said viewing range, and, automatically calculating said accumulated monetary charge, in part, proportional to said count of electronic devices within said viewing range.

10. The method of claim 9, wherein, said count of electronic devices within viewing range is obtained, in part, using cellphone-to-tower RF signal monitoring of a cellphone associated with a viewer.

11. The method of claim 10, wherein said viewing range is a distance that is less than or equal to a maximum distance from which said display of said modified video image stream on said display device is intelligible to an average sighted human.

12. The method of claim 8 further comprising:

automatically transferring, using said digital processor, a digital asset having a monetary value equal to said accumulated monetary charge from a client account to a provider account.

13. The method of claim 8, wherein, said substitute image is a video image sequence equal in temporal duration to said cognate image sequence.

14. The method of claim 8, wherein said accumulated monetary charge is automatically calculated, in part, proportional to a temporal duration of said cognate image sequence.

* * * * *